United States Patent
Yang et al.

(10) Patent No.: US 9,661,665 B2
(45) Date of Patent: May 23, 2017

(54) NETWORK CONNECTIVITY PROTOCOL FOR REAL-TIME APPLICATIONS

(71) Applicant: Apple Inc., Cupertino, CA (US)

(72) Inventors: Yan Yang, San Jose, CA (US); Berkat S. Tung, San Jose, CA (US); Hyeonkuk Jeong, Saratoga, CA (US); Justin N. Wood, Los Gatos, CA (US); Pierre J. De Filippis, San Jose, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 14/842,730

(22) Filed: Sep. 1, 2015

(65) Prior Publication Data

US 2016/0066352 A1 Mar. 3, 2016

Related U.S. Application Data

(60) Provisional application No. 62/044,882, filed on Sep. 2, 2014.

(51) Int. Cl.
| | |
|---|---|
| *H04W 76/02* | (2009.01) |
| *H04L 29/06* | (2006.01) |
| *H04W 4/12* | (2009.01) |
| *H04W 40/02* | (2009.01) |
| *H04W 40/24* | (2009.01) |
| *H04W 84/12* | (2009.01) |

(52) U.S. Cl.
CPC ............. *H04W 76/02* (2013.01); *H04L 65/10* (2013.01); *H04L 65/80* (2013.01); *H04L 69/14* (2013.01); *H04W 4/12* (2013.01); *H04W 40/02* (2013.01); *H04W 40/246* (2013.01); *H04W 84/12* (2013.01)

(58) Field of Classification Search
None
See application file for complete search history.

(56) References Cited

U.S. PATENT DOCUMENTS 7,941,551 B2 * 5/2011 Anantharaman . H04L 29/12528
709/227
8,776,188 B2 * 7/2014 Manion .................. H04L 63/08
726/5

(Continued)

*Primary Examiner* — Christine Duong
(74) *Attorney, Agent, or Firm* — Downey Brand LLP

(57) ABSTRACT

Apparatus and methods to evaluate connectivity between a primary device and a secondary device to support a connection for a real-time application to a remote device are disclosed. The primary device receives a connection request from the remote device and sends invitations to one or more secondary devices to connect with the remote device, the invitations sent through a first communication path. A secondary device that receives the invitation sends a connectivity evaluation packet to the primary device through a second communication path. When a connectivity response is received from the primary device through the second communication path and a user accepts the invitation, the secondary device sends an invitation response to the primary device and subsequently establishes a connection to the primary device through the second communication path. In some embodiments, the first communication path includes a cloud-based server that provides a guaranteed delivery message service.

20 Claims, 7 Drawing Sheets

(56) References Cited

U.S. PATENT DOCUMENTS

2013/0031611 A1* 1/2013 Barreto ............... G06Q 10/06
                                                    726/4
2015/0200983 A1* 7/2015 Pearce ............... H04L 65/403
                                                    709/205
2015/0350599 A1* 12/2015 Yang .................. H04N 7/15
                                                    348/14.02

* cited by examiner

NETWORK CONNECTIVITY PROTOCOL FOR REAL-TIME APPLICATIONS

CROSS-REFERENCE TO RELATED APPLICATIONS

This application claims the benefit of U.S. Provisional Patent Application No. 62/044,882, filed on Sep. 2, 2014, which is incorporated by reference herein in its entirety for all purposes.

FIELD

The described embodiments set forth techniques for evaluating network connectivity for real-time applications that provide communication capabilities for computing devices that interconnect with mobile wireless devices.

BACKGROUND

Mobile wireless devices include communication capabilities to access a multitude of services through different connections including voice, video, and data connections over a variety of wireless networks, including in some cases both cellular wireless networks and wireless local area networks. A user of a mobile wireless device can subscribe to services that provide for connections through a cellular wireless network. The user can also associate the mobile wireless device and other computing devices with a cloud-based service that can be used for a number of additional services, e.g., backup storage and cloud-based applications. To extend the reach of a user's mobile wireless device's connectivity capabilities, a cloud-based service can provide notification of a connection request, e.g., an incoming mobile terminated call, at one or more other computing devices to which the user may have access. The user can thereby be informed of a connection request without having to receive an alert directly at the mobile wireless device. In addition, the user can seek to use the additional connectivity capabilities of the mobile wireless device to extend the connection from the mobile wireless device to one of the other computing devices, e.g., by establishing a connection between the mobile wireless device and one of the other computing devices. The real-time connection between the mobile wireless device and one of the other computing devices, however, can traverse a different communication path from a path used to provide the connection request notification. Receipt of the notification at a computing device does not guarantee that a communication link that supports a real-time communication service can be established between the computing device and the mobile wireless device that received the connection request. As such, there exists a need to evaluate network connectivity for real-time applications when using a set of associated computing devices of a mobile wireless device.

SUMMARY

Apparatus and methods to evaluate connectivity between a primary device, e.g., a mobile wireless device, and a secondary device, e.g., a computing device, to support a connection for a real-time application to a remote device are disclosed. The primary device receives a connection request from the remote device, such as an incoming mobile-terminated call, and sends invitations to one or more secondary devices to connect with the remote device. The primary device sends the invitations to the one or more secondary devices through a first communication path, which can traverse a wide area network in some embodiments. A secondary device that receives one of the invitations sends one or more connectivity evaluation packets to the primary device through a second communication path, which can traverse a local area network separate from the wide area network, in some embodiments. When the secondary device receives a connectivity response from the primary device through the second communication path, the secondary device provides an indication of the invitation to connect with the remote device to a user of the secondary device. When the user accepts the invitation to connect with the remote device at the secondary device, the secondary device sends an invitation response to the primary device. Subsequently, when the secondary device receives a connection establishment message from the primary device, the secondary device establishes the connection to the primary device to support the real-time application through the second communication path. In some embodiments, the first communication path includes a cloud-based server that provides a guaranteed delivery message service, which can include a push notification service. In some embodiments, the primary device and the secondary devices share a common identifier for a cloud-based service. In some embodiments, invitations to connect are sent only to secondary devices that are actively signed in to the cloud-based service. In some embodiments, the connectivity evaluation packets comprise user datagram protocol (UDP) packets, which include an Internet Protocol (IP) address and a port identifier of the secondary device to which the primary device can send the connectivity response and through which the connection to support the real-time application can be established with the primary device. In some embodiments, the invitation to connect that is sent to the secondary device includes an IP address and a port identifier of the primary device to which the secondary device sends the connectivity evaluation packet.

Other embodiments set forth hardware components that are configured to carry out the various techniques set forth herein. Further embodiments set forth a non-transitory computer readable storage medium configured to store instructions that, when executed by a processor, cause the processor to carry out the various techniques set forth herein.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art

DETAILED DESCRIPTION

Figure 1:
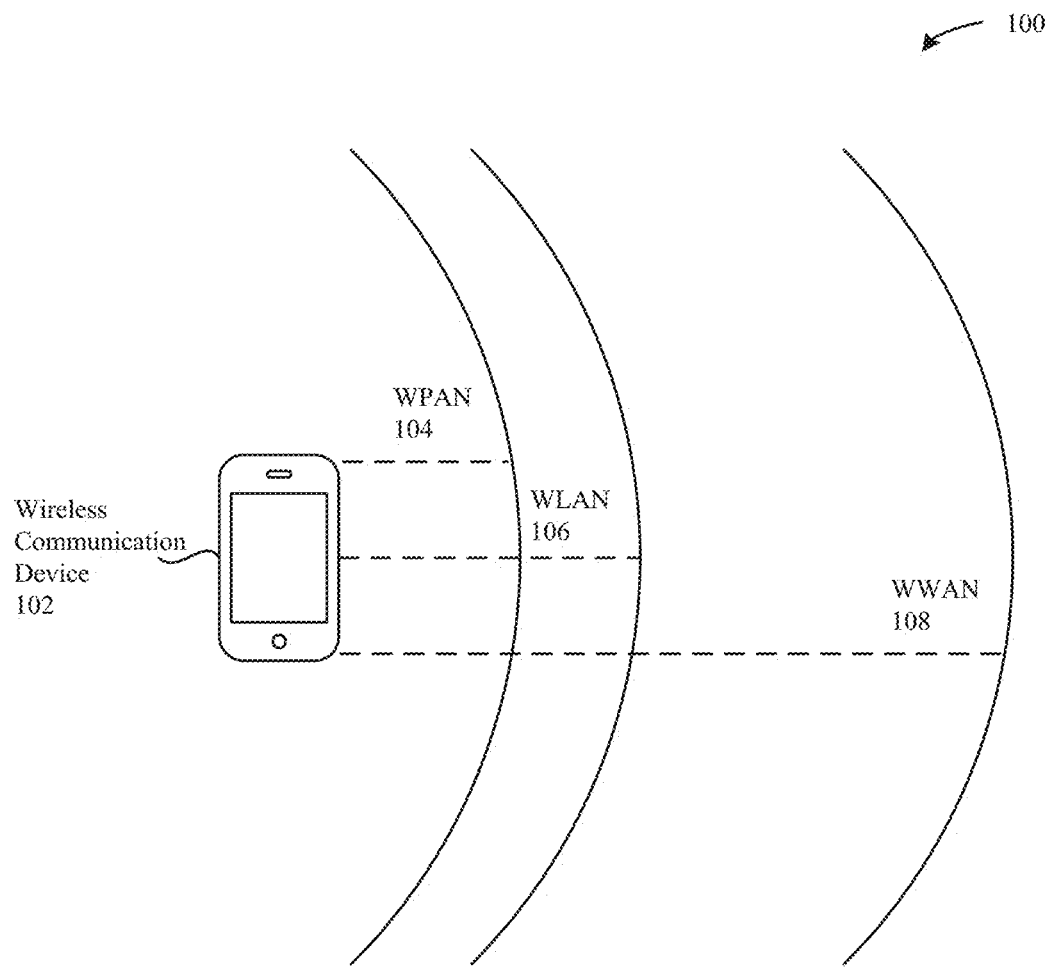
FIG. 1 illustrates an example wireless communication device capable of operating in one or more different wireless communication networks, in accordance with some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments relate generally to wireless communications and more particularly set forth techniques to evaluate network connectivity for real-time applications that provide communication capabilities for computing devices that interconnect with mobile wireless devices. The mobile wireless device can relay an invitation for or a notification of an incoming connection request from a remote device to one or more computing devices to which the mobile wireless device can attempt to connect to form a tandem connection with the remote device. A communication path between the mobile wireless device and one or more of the computing devices can be evaluated before providing a user the invitation/notification to ensure that subsequent connectivity between the mobile wireless device and at least one of the computing devices can support (or has a high likelihood of supporting) a connection that can extend a connection from a remote device through the mobile wireless device to at least one of the computing devices.

Wireless communication devices provide for a broad array of services through one or more wireless networks. A user of a mobile wireless device, such as a cellular wireless communication device, can subscribe to services that provide real-time voice connections (whether via circuit-switched networks or packet-switched networks), data connections, which can include real-time video connections such as Facetime®, as well as non-real-time connections for Internet connectivity, email, etc., and messaging, such as short message service (SMS). The user of the mobile wireless device can also register with a cloud-based service, such as iCloud, to access additional services, such as used for back-up storage, file sharing, and media/mail/notification synchronization. Additional computing devices, such as personal computers, laptop computers, tablet devices, and other mobile wireless devices can also be registered with the same cloud-based service and provide access to common content. The cloud-based service can also provide notifications between different devices that share the same service. A user of a mobile wireless device can extend access to services via connections, both incoming and outgoing, that traverse the mobile wireless device by establishing an extension connection from the mobile wireless device to another device, e.g., via a local area network. The user of the mobile wireless device can receive a notification of an incoming connection request, such as to set up a mobile-terminated call, from a remote device. The notification of the incoming connection request can be provided to multiple secondary devices that share a common cloud-based service account, such as provided by an AppleID for an iCloud account, with the primary mobile wireless device. The user of the primary device can be notified of the incoming connection request at one or more of the multiple secondary devices and can accept the incoming connection at one of the secondary devices, which can result in a tandem connection from the secondary device to the primary device, e.g., through a wireless local area network, and from the primary device to the remote device, e.g., through a cellular wide area network. The notification for the connection request traverses a different path, e.g., from the primary device via an iCloud server over a secure, guaranteed delivery message service to the secondary device(s), while the extension connection, when established, traverses directly between the primary and secondary devices, e.g., through a wireless local area network connection. Receipt of the notification by a secondary device does not guarantee that the extension connection can be established. As such, techniques to evaluate connectivity rapidly and simply are desired to ensure that a reliable connection can be established before presenting the notification of the incoming connection request to a user at one or more of the secondary devices.

In some embodiments, a primary device, e.g., a mobile wireless device, can provide a notification to one or more secondary devices of an incoming connection request. The connection request can originate from a remote device through a wireless wide area network (WWAN), e.g., a cellular wireless network and/or via an Internet connection. The primary device can relay the incoming connection request to one or more secondary devices, e.g., via a push notification through a cloud-based service. The one or more secondary devices and the primary device can, in some embodiments, be commonly identifiable as belonging to a set of associated devices, e.g., by using a common identifier such as a particular AppleID for a user account. The cloud-based service can forward the notifications to at least one of the set of secondary devices while the incoming connection request is still pending. In some embodiments, the notification is forwarded only to secondary devices that are actively signed in to the cloud-based service. Before providing an indication of the incoming connection request on a secondary device, the secondary device can transmit a connectivity evaluation message, e.g., using a simple, minimal messaging protocol such as by sending a User Datagram Protocol (UDP) transport layer packet, to the primary device. The UDP packet can be sent to an Internet Protocol (IP) address and a destination port as provided in the notification sent to the secondary device. The UDP packet can also include a source address of the secondary device and a source port number, which may be subsequently used for a connection between the primary device and the secondary device. The UDP packet can be used to evaluate whether an IP connection can be established between the primary and secondary devices using the IP addresses and ports indicated. The primary device can respond to the UDP packet received from the secondary device by sending a UDP response packet back to the secondary device. With receipt of the UDP response packet, the secondary device can determine that with high probability an IP connection can be established with the primary device. After receipt of the UDP response packet, the secondary device can provide an indication of the incoming connection request, e.g., through an alert, email message, or other notification means that can indicate to a user of the secondary device that an incoming connection request (via the primary device) is pending. When the user responds affirmatively to the notification of the incoming connection request, the secondary device can send a response to the primary device to accept or deny the incoming connection request. In some embodiments, the response to the notification can be sent via the cloud-based service that delivered the notification. When the response to the notification received by the primary device indicates an acceptance of the incoming connection request, the primary device can establish a connection with the secondary device, e.g., an IP connection via a WLAN, and also complete establishment of a connection with the remote device, e.g., via a cellular WWAN. In some embodiments, the notification from the primary device can include a list of IP addresses and/or a list of identifiers of ports that can be used for an IP connection between the primary device and the secondary device. In some embodiments, the UDP packet can be sent to one or more of the IP addresses and/or to one or more of the ports indicated in the notification to evaluate connectivity between the primary device and the secondary device. In some embodiments, the UDP response packet from the primary device to the secondary device can include a particular IP address and an identifier of a port to which the subsequent IP connection should be attempted. In some embodiments, the UDP packet sent from the secondary device to the primary device includes a list of one or more IP addresses and/or list of identifiers of one or more ports to which an IP connection can be established. In some embodiments, the UDP response packet is sent to multiple IP addresses and/or multiple ports. The secondary device can select from multiple IP connection paths when multiple IP addresses and/or multiple port identifiers are provided, and in some embodiments, the secondary device can provide an indication of a preferred or selected IP address and port combination to the primary device, e.g., via the acceptance of the connection request. Thus, the primary and secondary devices can not only evaluate connectivity, but also, in some embodiments, evaluate properties of potential connection paths between them to determine a best or preferred path that satisfies one or more performance criteria. For example, the performance criteria can include a round trip delay time between the primary and secondary devices.

FIG. 1 illustrates an example diagram 100 of a set of overlapping networks for a wireless communication device 102. The wireless communication device 102 can include a combination of hardware and software to provide wireless connections over one or more different wireless networks alone, separately, or in combination. The wireless communication device 102 can include hardware and software to provide communication over a wireless personal area network (WPAN) 104 that can provide power efficient connections while operating over a limited range. WPAN connections can typically provide for connecting the wireless communication device 102 to peripheral wireless communication devices, e.g., headsets, earpieces, supplemental display devices, and supplemental input/output devices. A representative WPAN 104 can operate in accordance with a communication protocol specified by the Bluetooth SIG. The wireless communication device 102 can also include hardware and software to provide communication over a wireless local area network (WLAN) 106 that can provide a higher data rate and a greater operating range than a WPAN 104. The wireless communication device 102 can include separate hardware and software for the WPAN 104 and the WLAN 106. In some embodiments, the WPAN 104 and the WLAN 106 can share hardware and or software elements in the wireless communication device 102. Both the WPAN 104 and WLAN 106 can operate as local networks. The wireless communication device 102 can include additional hardware and software to provide a wireless wide area network (WWAN) 108 capability, e.g., to interconnect with one or more cellular wireless networks, e.g., via access network equipment (not shown). The wireless communication device 102, which can also be referred to as mobile device, a mobile wireless device, or other equivalent terms and can represent a mobile computing device (e.g., an iPhone® or an iPad® by Apple®).

Wireless network interface circuitry in the wireless communication device 102 can include one or more wireless circuitry modules that include one or more processors and wireless circuits to transmit and receive wireless signals according to various wireless communication protocols. A wireless circuitry module (which can also referred to as a wireless subsystem and/or a radio) of the communication device 102 can include transmitters and receivers to provide signal processing of radio frequency wireless signals formatted according to wireless communication protocols, e.g., according to a Wi-Fi wireless communication protocol, a Bluetooth wireless communication protocol, or a cellular wireless communication protocol. In some embodiments, the wireless circuitry module can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components.

Figure 2:
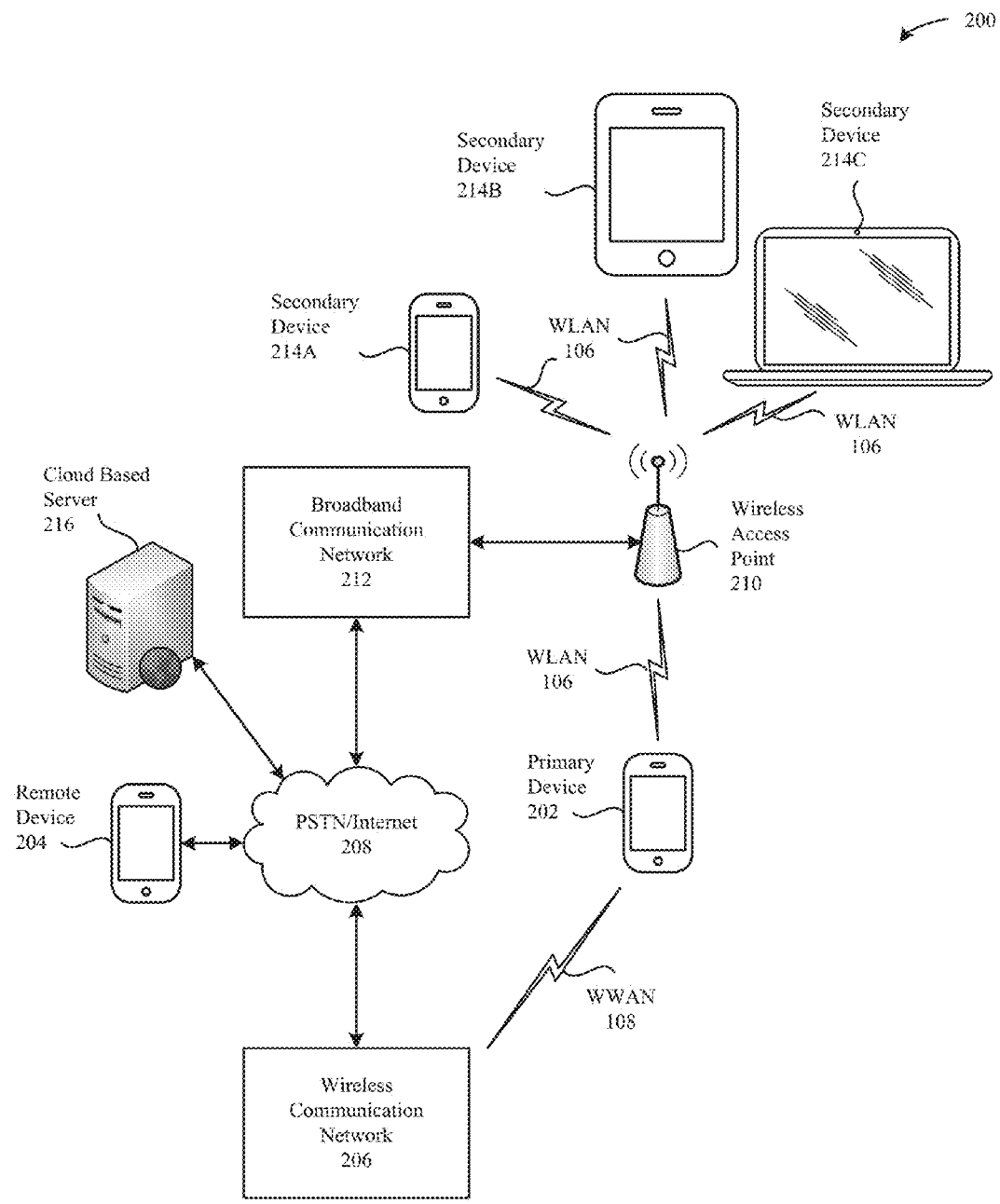
FIG. 2 illustrates a block diagram of a representative set of wireless communication paths interconnecting a primary wireless device through multiple wireless communication networks to one or more secondary wireless devices and a remote device, in accordance with some embodiments.

FIG. 2 illustrates an example diagram 200 of a wireless communication device, labeled as a primary device 202, interconnected through several different wireless communication technologies to an external set of wired/wireless networks to which a set of other computing devices, labeled as secondary devices 214A, 214B, and 214C also can be interconnected. The primary device 202 can receive information from one or more packet switched networks and/or from one or more circuit switched networks, the combination of which is represented in FIG. 2 as a combination of a public switched telephone network (PSTN) and the Internet 208. The primary device 202 can use a WWAN connection 108 provided through a wireless communication network 206 to access a broad variety of services (e.g., voice calls, text messages, data access, video calls, multimedia messaging, and media streaming). Similarly, the primary device 202 can use a WLAN connection 106 provided through a wireless access point (AP) 210 interconnected to a broadband communication network 212 to access a similar wide range of services. The connection capabilities of the primary device 202 can be supplemented by adding one or more WLAN connections 106 to one or more secondary devices 214 as illustrated in FIG. 2 via the common wireless AP 210.

A remote device 204 can seek to establish a connection with the primary device 202, e.g., through the wireless communication network 206 or the broadband communication network 212. The remote device 204 can be a wired or wireless device that can connect via any communication technology through a public or private network. The primary device 202 can receive an indication of an incoming connection request, which can include setting up a voice call, a text session, a video session, or any other similar real-time service connection that can be used for a real-time application. The primary device 202 can be associated with a cloud-based service account, e.g., an iCloud account, which can be managed by one or more cloud-based server(s) 216. The primary device 202 can be signed in or otherwise actively associated with the cloud-based service account and can relay an indication/notification of an incoming connection request to one or more other devices, e.g., secondary devices 214 A/B/C, that also are actively associated with the cloud-based service account. The notification can be communicated by the cloud-based server 216 to the secondary devices 214 A/B/C, which each can independently, in parallel, provide an indication of the notification of the incoming connection request to a user. The user can respond to at least one of the indications to accept, deny, or otherwise direct a response for the incoming connection request. To ensure that a connection between a secondary device 214 and the primary device 202 can be established to support an extension of a connection from the remote device 204 to the primary device 202, the secondary device 214 can evaluate connectivity to the primary device 202. In a preferred embodiment, evaluation of the connectivity between the secondary device 214 and the primary device 202 can occur before providing an indication of the incoming connection request to the user. By evaluating connectivity, indications of the incoming connection request can be provided to the user only through secondary devices 214 that can support (or have a high likelihood of supporting) a subsequent connection. The notification of the incoming connection request can be communicated from the primary device 202 via the cloud-based server 216 through the Internet 208 via the broadband communication network 212 and the wireless access point 210 to the secondary devices 214 A/B/C. The indication can take the form of an invite message that is communicated through the Internet 208 using a secure message connection having a guaranteed delivery mechanism. Thus a notification/invite message that indicates the incoming connection request can reach the secondary devices 214 that are signed in to the cloud-based service account without knowledge of whether an actual IP connection between the primary device 202 and the secondary devices 214 can be established.

When a secondary device 214 responds affirmatively to a notification/invite message, an invite response message is communicated to the primary device 202 also via the cloud-based server 216. As several secondary devices 214 can respond affirmatively to the notification/invite message, the primary device 202 can determine with which secondary device 214 of those that respond affirmatively to connect. A subsequent IP connection, e.g., a UDP connection, can be established directly between the selected secondary device 214 and the primary device 202. The IP/UDP connection can support data packets that extend a parallel connection established between the primary device 202 and the remote device 204 that originally requested the connection. The notification/invitation messages, however, are communicated through a different connection path than used for the subsequent IP/UDP connection, and there is no guarantee that the IP/UDP connection can be established based solely on receipt of the notification/invitation message at a secondary device 214. In some circumstances, such as based on a configuration of the primary device 202 and/or the secondary devices 214, the wireless access point 210, an intervening router or firewall (not shown), the IP/UDP connection between the primary device 202 and one or more of the secondary devices 214 may be not able to be established. Thus, there is a need to determine quickly and simply whether an IP/UDP connection can be (or has a high likelihood of being) established before providing an indication of the notification of the incoming connection request to a user via the secondary devices 214 (and without trying to establish the IP/UDP connection in advance).

As described further herein, the indication/notification of the incoming request can be provided to a user only at secondary devices 214 that are reachable through the network that will support an IP/UDP connection to be subsequently established. In some embodiments, the indication/notification message provided by the primary device 202 to the secondary devices 214 can include information for establishing the subsequent IP/UDP connection, e.g., an IP address (or a list of IP addresses) for the primary device 202 and an identifier for a port (or a list of identifiers for ports) of the primary device 202 to which the subsequent IP/UDP connection should be established. The same information can be provided to all secondary devices 214. Each secondary device 214 can evaluate connectivity using the information provided in the indication/notification message before providing an indication/notification to a user. In some embodiments, an IP/UDP connection may only be established (or used for an extension of an incoming connection) when both the primary device 202 and the secondary device 214 are on a common network, e.g., within a common subnet. In some embodiments, a firewall can be interposed between the primary device 202 and the secondary device 214 and can be configured in such a manner that the IP/UDP connection may not be able to be established. Similarly, the primary device 202 may be unreachable to the secondary device 214 (or vice versa) because of network address translator (NAT) issues. To reduce a likelihood of issues when establishing a subsequent IP/UDP connection, the primary device 202 and the secondary device 214 can evaluate connectivity. It is noted that a common subnet mask, e.g., for a subnet to which both the primary device 202 and the secondary device 214 are both associated, may not suffice to determine connectivity between them. Although the secondary device 214 can use an IP address (or list of IP addresses) provided from the primary device 202 in the indication/notification message to determine whether the primary device 202 is in the same subnet, the primary device 202 may still not be reachable from the secondary device 214. For example, when both the primary device 202 and the secondary device 214 use public, routable addresses rather than private, subnet addresses, the subnet mask comparison may not indicate properly whether the primary device 202 and the secondary device 214 can connect to each other. The two devices may be able to establish a connection but not share a common subnet mask, e.g., as can occur on a large, interconnected, corporate network.

Although the Session Traversal Utilities for NAT (STUN) as specified in the Internet Connectivity Establishment (ICE) RFC 5389 provide for connectivity checking between two endpoint devices, the ICE STUN procedures can require bi-directional communication of IP addresses and ports between the primary device 202 and each of the secondary devices 214. An ICE check for connectivity can thus require more time (and therefore delay in establishing a connection with the remote device 204) and may also require substantial resources of the primary device 202 to check all of the secondary devices 214 to which an indication/notification is sent. Thus, solutions described herein seek to reduce a time to determine connectivity while reducing and/or eliminating false connections. Similarly, a connectivity evaluation based on the Internet Control Message Protocol (ICMP) ping network utility may not provide a correct indication of whether a connection between a specific IP address and port of the primary device 202 and a specific IP address and port of the secondary device 214 can be established. A lack of a response to a ping may indicate a blockage that will not occur when attempting to establish an IP/UDP connection between the primary device 202 and the secondary device 214. In some cases, a server and/or a firewall can be configured to disable replies to ping messages for security reasons, and as such a lack of response to a ping message may not be used to reliably determine wither an IP/UDP connection can be established between two devices.

Each secondary device 214 decides whether to provide an indication of the incoming connection request to a user based on a determination that an IP/UDP connection can be established with the primary device 202 to support a session as requested in the notification. Methods that do not require the primary device 202 to maintain a state of connections (or possible connections) to each secondary device 214 and can rapidly determine connectivity without a complex protocol message exchange sequence are preferred. Each secondary device 214 can determine connectivity to the primary device 202 in parallel, which provides for a quicker determination than when determined solely at the primary device 202. In some embodiments, each secondary device 214 that receives an indication/notification message for the incoming connection request can send a UDP packet to the primary device 202. The indication/notification message can include an IP address and an identifier for a port (and/or a list of IP addresses and/or identifiers for ports) of the primary device 202 to which the secondary device 214 can send the UDP packet(s) to evaluate connectivity. The UDP packet can include an IP address and an identifier for a port (and/or a list of IP addresses and/or identifiers for ports) of the secondary device 214 to which the primary device 202 can respond. In some embodiments, the primary device 202 echoes any UDP packets received back to the corresponding secondary devices 214. It is noted that a positive response from the primary device 202 can provide an indication that an IP/UDP connection has a high likelihood of being subsequently established; however, one secondary device 214 (if any) can be later selected by the primary device 202 for the IP/UDP connection, e.g., when multiple secondary devices 214 respond affirmatively to the notification/invitation. When a secondary device 214 receives a response to the UDP packet, an indication/notification can be provided to the user for the incoming connection request. For example, an auditory, visual, and/or haptic alert can be provided or other notification mechanism implemented at the secondary device 214 to notify the user of an incoming connection request. The user can respond through a mechanism, e.g., as provided through an input/output device and/or via a display or other interface to accept, deny, or otherwise direct a response for the incoming connection request. In some embodiments, when no response is received within a timeout period by the secondary device 214 to the UDP packet, one or more additional UDP packets can be sent to the primary device 202. When no response is received, after one or more attempts and/or after a timer expires, the secondary device 214 can ignore the indication/notification for the incoming connection request. In some embodiments, an indication or message of the attempt can be logged at the secondary device 214, e.g., to provide an indication of a missed connection attempt. In some embodiments, a secondary device 214 can support IP/UDP connections through multiple different interfaces, e.g., through a Wi-Fi connection and an Ethernet connection, simultaneously over the same network. As such, the secondary device 214 can send one or more UDP packets via multiple interfaces to the primary device 202 to determine whether an IP/UDP connection can be supported and to determine one or more properties of communication paths through the interfaces by which a particular interface can be selected to use for the IP/UDP connection. For example, an interface can provide a connection that has a preferred set of properties, e.g., a supportable data rate or range of data rates, a delay value or range of delay values, or any set of performance criteria that can indicate whether a particular quality of service (QoS) is supportable over an IP/UDP connection through the interface. In some embodiments, the secondary device 214 can measure a round-trip delay time from sending the UDP packet to receiving a UDP packet in response for each interface that can support an IP/UDP connection for the incoming connection request. In some embodiments, the time to evaluate an IP/UDP connection can be bounded, e.g., up to five seconds, in order to ensure a decision occurs before the incoming connection request at the primary device 202 is diverted, such as to voice mail by the primary device 202 and/or by the network through which the incoming connection request is communicated to the primary device 202.

Figure 3:
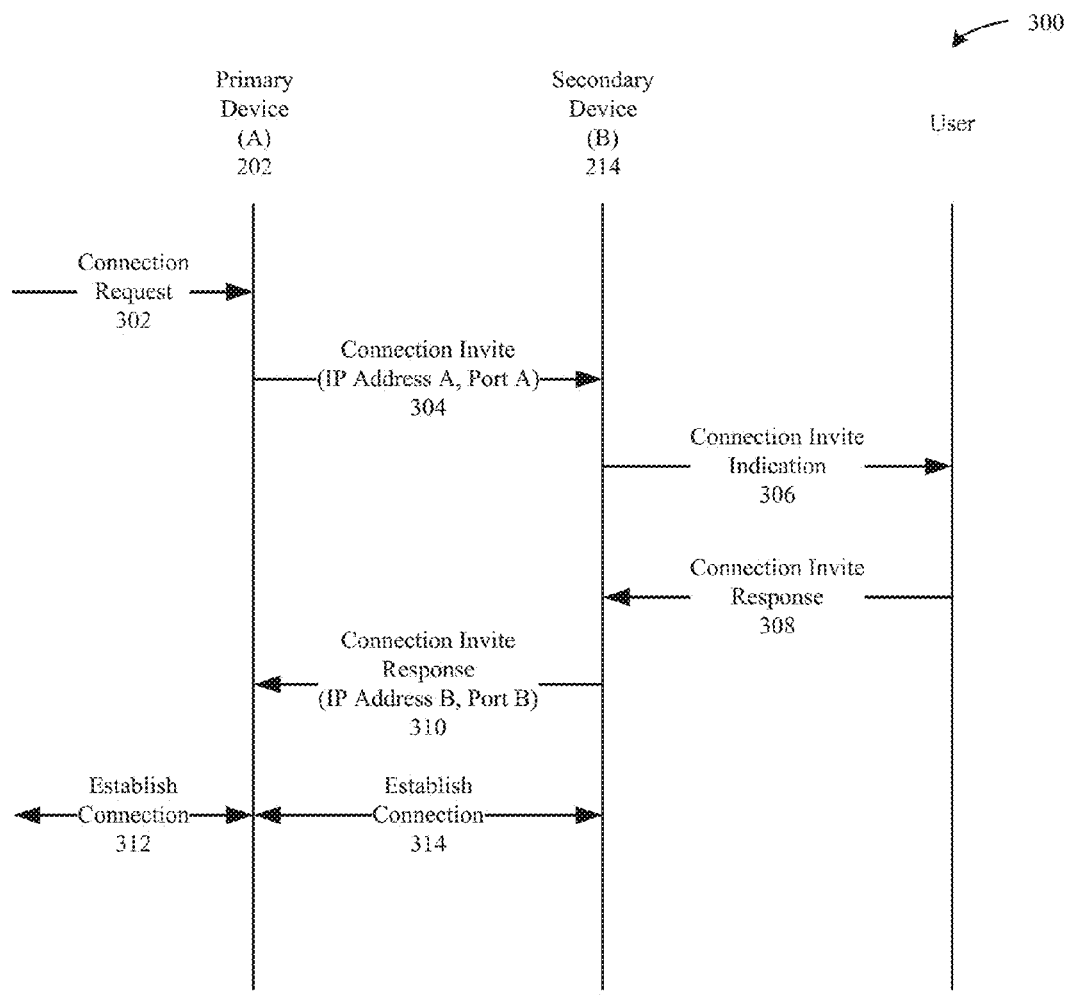
FIG. 3 illustrates an example message exchange sequence between a primary device and a secondary device to establish a connection with a remote device, in accordance with some embodiments.

FIG. 3 illustrates an example diagram 300 of a message exchange sequence between a primary device 202 (also indicated as device A) and a secondary device 214 (also indicated as device B). The primary device 202 can receive a connection request 302, which can indicate a request to establish a connection with the primary device 202, e.g., from a remote device 204. The connection request 302 can originate from a cellular wireless network and in response the primary device 202 can send an indication/notification of the connection request 302 formatted as a connection invite message 304 to the secondary device 214. The connection invite message 304 can include an IP address A and an identifier for a port A of the primary device 202 to which a connection between the primary device 202 and the secondary device 214 can be established to support an extension of the incoming connection from the primary device 202 to the secondary device 214. As shown in FIG. 3, the secondary device 214 can provide a connection invite indication 306 in response to receipt of the connection invite message 304 to a user, who can respond by providing a connection invite response 308. The connection invite indication 306 can be provided through one or more different mechanisms by which an alert/notification/message can be provided to a user of the secondary device 214, e.g., via an auditory ring, a visual display, a pop-up message, a haptic alert, or any combination of these. The user can respond by selecting from one or more responses, e.g., to accept, to deny, to divert, to send a brief responsive message, etc., and a connection invite response 310 can be provided to the primary device 202. In some embodiments, when a user selects to accept the incoming connection request, the connection invite response 310 can include an IP address B and an identifier of a port B of the secondary device 214 to which the primary device 202 can subsequently establish an IP/UDP connection to support extension of the incoming connection request. The primary device 202 and the secondary device 214 can subsequently establish the IP/UDP connection 314, while the primary device 202 can also respond to the connection request 302 to establish a connection 312 with the remote device 204 from which the connection request originates. The message exchange sequence illustrated in FIG. 3, however, can result in a flawed connection, e.g., when the connection via a WWAN 108 is established between the remote device 204 and the primary device 202 but the extension connection via a WLAN 106 (or other local network) cannot be established. The user, in responding affirmatively to the connection invite indication 306, can expect that the incoming connection will complete, but the secondary device 214 can be unable (based on a lack of a connectivity evaluation in FIG. 3) to determine that an IP/UDP connection between the primary device 202 and the secondary device 214 can be established to support extending the connection through the primary device 202 to the secondary device 214. As described further herein, a connectivity evaluation can be applied before providing the connection invite indication 306 to the user to avoid falsely indicating a possible connection prematurely to the user.

Figure 4:
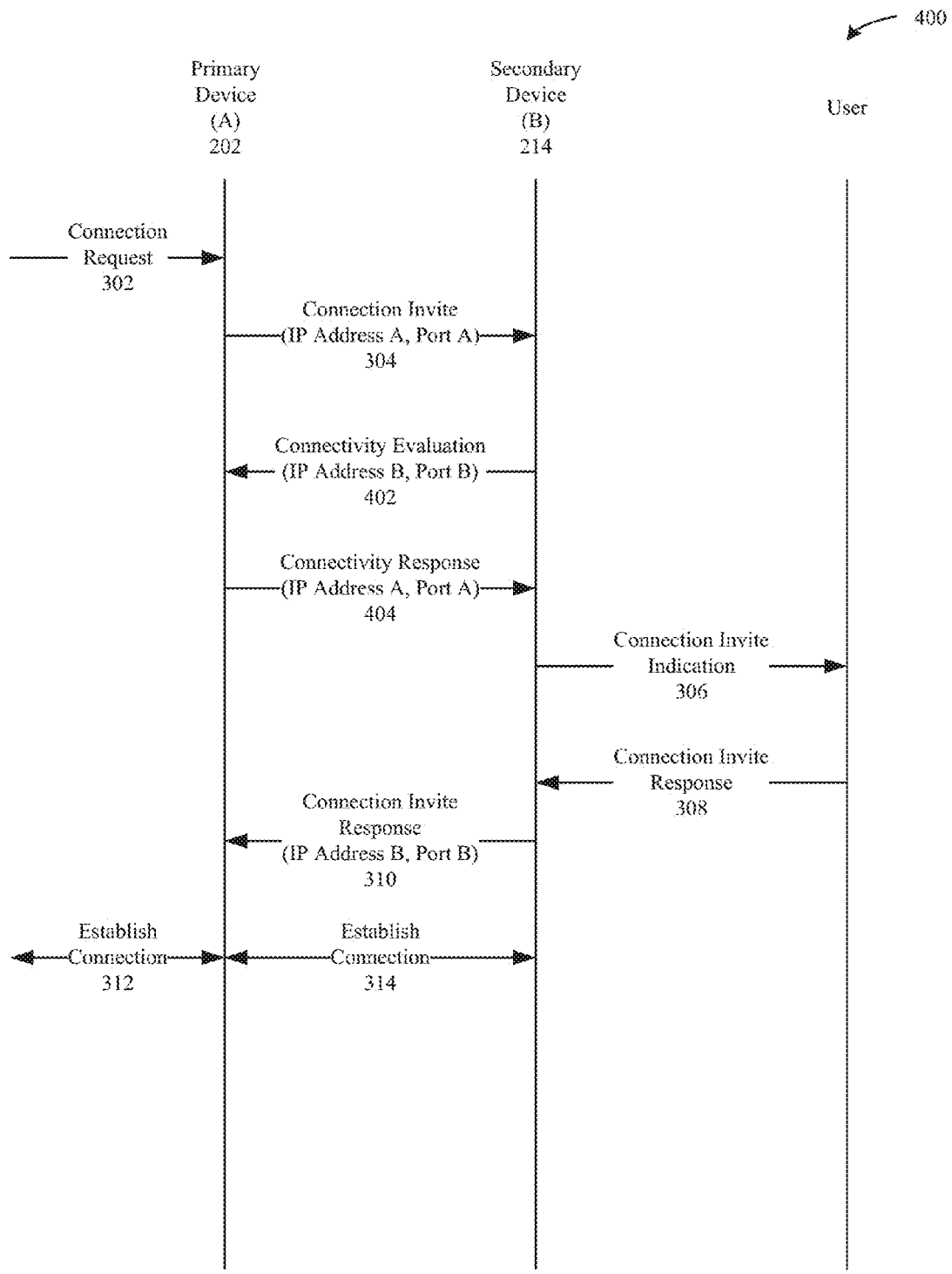
FIG. 4 illustrates another example message exchange sequence between the primary device and the secondary device to evaluate connectivity for establishing a connection with a remote device, in accordance with some embodiments.

FIG. 4 illustrates an example diagram 400 of another message exchange sequence between the primary device 202 and the secondary device 214 that includes a connectivity evaluation. As indicated, the primary device 202 (also indicated as device A) can include an IP address A (or a list of IP addresses for device A) and an identifier for a port A (or a list of identifiers for ports for device A) in the connection invite message 304 sent to the secondary device 214 (also indicated as device B). The secondary device 214 can send one or more messages to evaluate connectivity between one or more ports/IP addresses of the secondary device 214 and the ports/IP addresses indicated for the primary device 202. In some embodiments, the secondary device 214 sends one or more UDP packets to evaluate connectivity with the primary device 202. Each UDP packet can include a source address, a source port identifier, a destination address, and a destination port identifier, in some embodiments. The secondary device 214 can send UDP packets to multiple ports/addresses to evaluate connectivity through multiple interfaces and/or across multiple networks to determine whether at least one connection path that can support an ensuing IP/UDP connection. The primary device 202 can respond to the connectivity evaluation message 402 by sending one or more connectivity response messages 404 back to the secondary device 214. In some embodiments, the connectivity response message 404 is a UDP packet. The connectivity response message 404 from the primary device 202 can include a particular IP address and identifier for a port of the primary device 202 to which a subsequent IP/UDP connection can be established by the secondary device 214. The exchange of connectivity evaluation and response messages between the primary device 202 and the secondary device 214 can determine in advance a connectivity path through which a subsequent IP/UDP connection can be established to extend the incoming connection request 302 from the remote device 204 through the primary device 202 to the secondary device 214. When the connectivity evaluation indicates positively that the IP/UDP connection can be established, the secondary device 214 can provide the connection invite indication 306 to the user, who can respond with a connection invite response 308. When the connection invite response 308 includes an accept or other positive indication to complete the connection as requested, the secondary device 214 can send the connection invite response 310 to the primary device 202. The connection invite response 310 can include a specific IP address and identifier for a port of the secondary device 214 to which the IP/UDP connection can be established. The primary device 202 can then establish the connection 312 with the remote device 204 and the IP/UDP connection 314 with the secondary device 214 to extend from the primary device 202 to the secondary device 214 the incoming connection.

Figure 5:
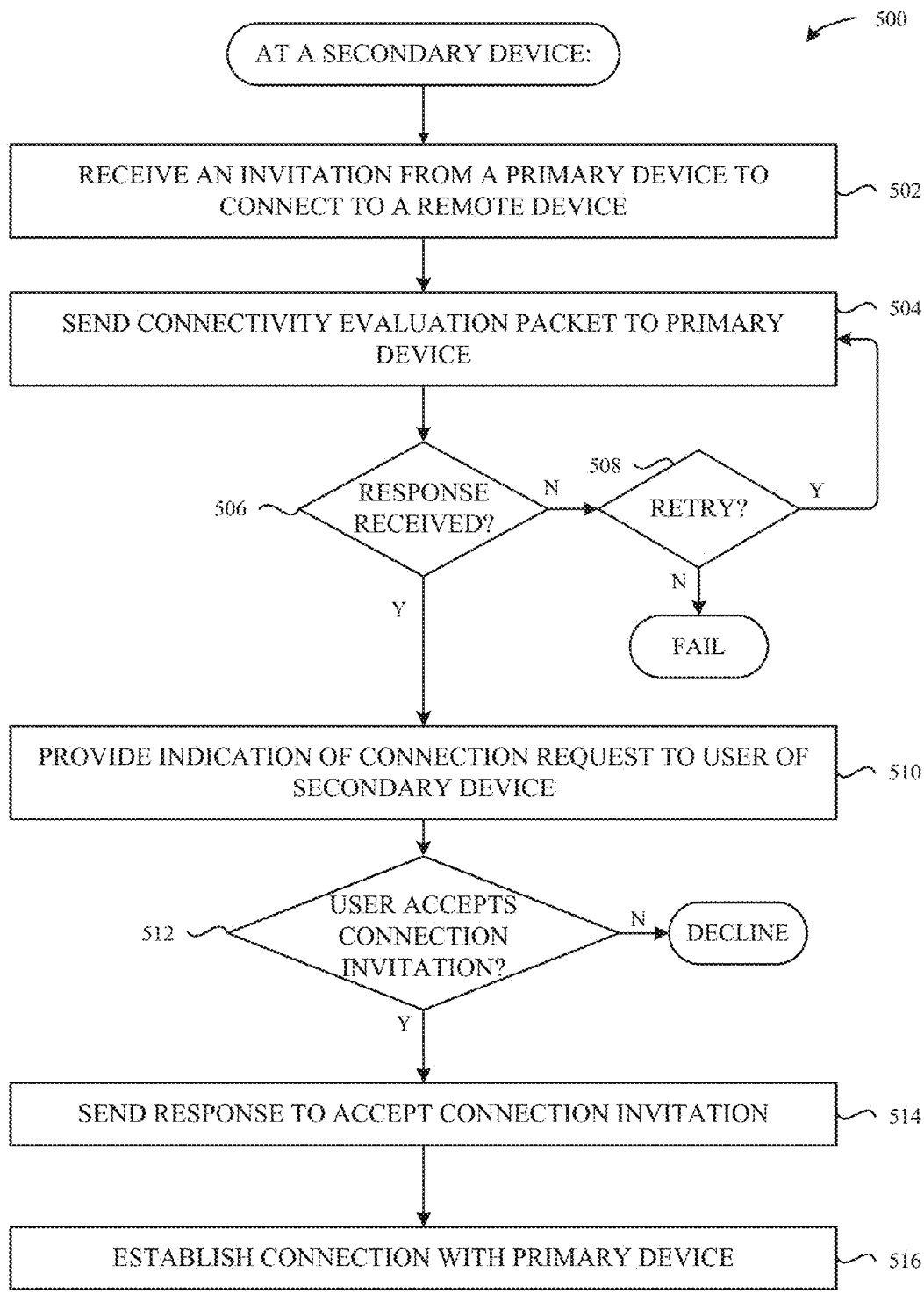
FIG. 5 illustrates an example method carried out at a secondary device to evaluate connectivity with a primary device when establishing a connection with a remote device, in accordance with some embodiments.

FIG. 5 illustrates an example flow chart 500 for a representative method executed at a secondary device 214 to evaluate connectivity in response to an invitation from a primary device 202. In step 502, the secondary device 214 can receive an invitation from a primary device 202 to connect to a remote device 204. In some embodiments, the primary device 202 and the secondary device 214 are each associated with a common identifier for a cloud-based service. In some embodiments, the invitation is provided as a notification, a message, or an alert through the cloud-based service to the secondary device 214 from the primary device 202. In some embodiments, the invitation includes at least one IP address and at least one identifier for a port to which the secondary device 214 can attempt to establish an IP/UDP connection with the primary device 202. In step 504, the secondary device 214 sends a connectivity evaluation packet to the primary device 202. In some embodiments, the connectivity evaluation packet is a UDP packet. In some embodiments, the connectivity evaluation packet includes at least one IP address and at least one identifier for a port to which the primary device 202 can attempt to establish the IP/UDP connection with the secondary device 214. In step 506, the secondary device 214 can determine whether a response is received from the primary device 202. In some embodiments, the secondary device 214 can determine whether to retry, as indicated in step 508, e.g., by sending an additional connectivity evaluation packet to the primary device 202. The secondary device 214 can be configured to send up to a threshold number of connectivity evaluation packets and/or to evaluate connectivity up to a threshold time period. When no response is received from the primary device 202 (after one or more attempts or a time period), the secondary device 214 can determine that the connectivity evaluation failed, and the method can end. When a response is received from the primary device 202, the secondary device can, in step 510, provide an indication of a connection request to a user of the secondary device 214. In some embodiments, the indication can include an alert, a message, an alarm, a ringtone, a notification, or another similar indication of an incoming connection request. In some embodiments, the indication includes information about the incoming connection request, e.g., an identification of the remote device 204 from which the incoming connection request originates, such as a number, an address, a contact, etc. In step 512, the secondary device 214 can determine whether the user accepts the connection invitation. When the connection invitation is not accepted, the secondary device 214 can enter a decline state. In some embodiments, the decline state ends the method. In some embodiments, the decline state includes logging information about the connection request. In some embodiments, the decline state includes an indication of an alternative action for the primary device 202 to take with respect to the connection request (not explicitly shown). For example, the user can indicate to divert the connection to a voice mail, email, or other service to which the remote device 204 can be connected rather than to the secondary device 214 and/or the primary device 202. When the user accepts the connection request invitation, the secondary device 214, in step 514, can send a response to the primary device 202 indicating the acceptance. In step 516, the secondary device 214 can establish a connection with the primary device 202 by which the incoming connection request can be extended from the primary device 202 to the secondary device 214. In some embodiments, the connection between the primary device 202 and the secondary device 214 is an IP/UDP connection. In some embodiments, the IP/UDP connection is established using IP addresses and ports exchanged as part of the connectivity evaluation and response packets. In some embodiments, the IP/UDP connection is established through a local area network connection through which both the primary device 202 and secondary device 214 can communicate. In some embodiments, the IP/UDP connection is established using an ad hoc peer-to-peer connection directly between the primary device 202 and the secondary device 214.

Figure 6:
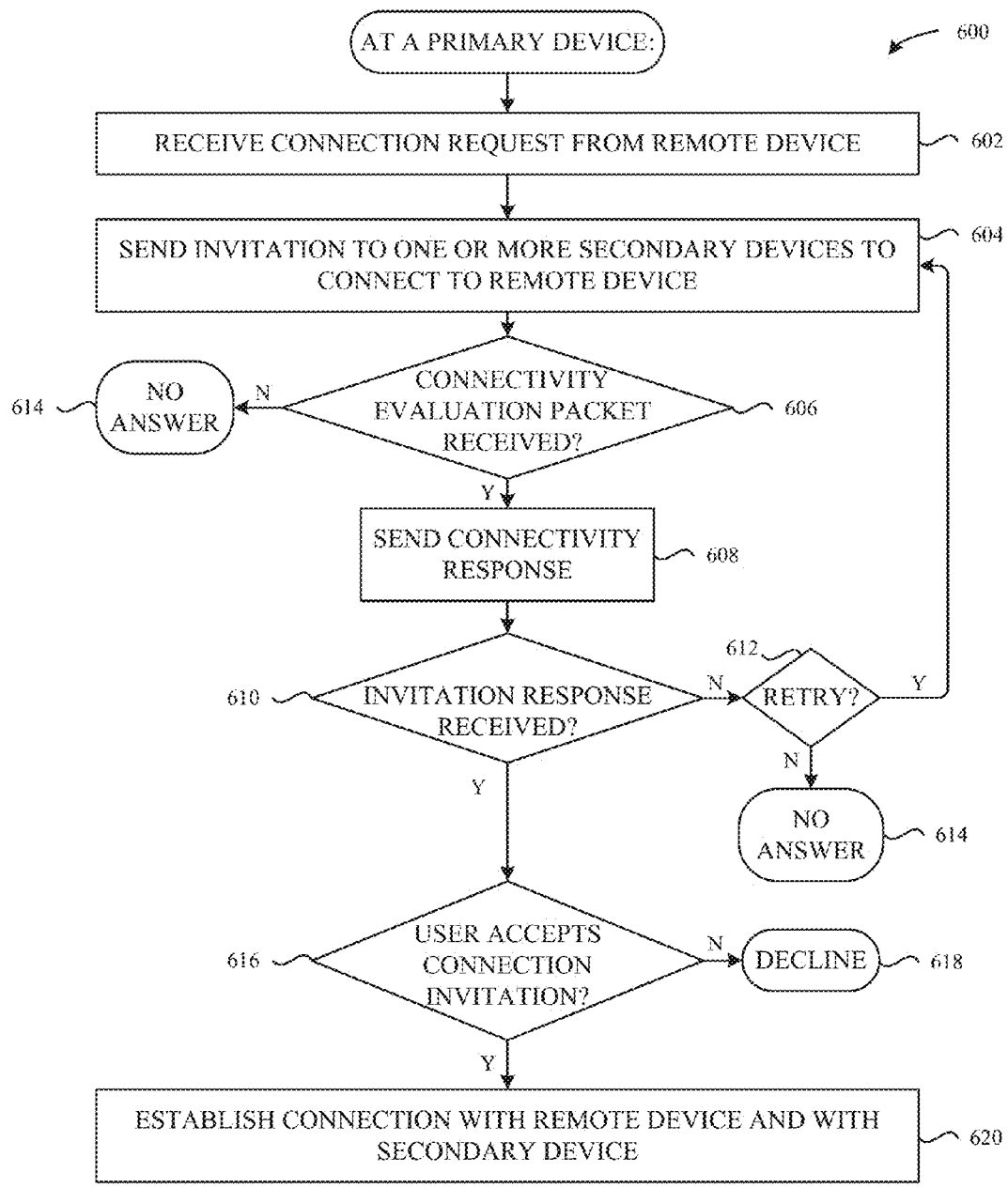
FIG. 6 illustrates an example method carried out at a primary device to evaluate connectivity with one or more secondary devices when establishing a connection with a remote device, in accordance with some embodiments.

FIG. 6 illustrates an example flow chart 600 for a representative method executed at a primary device 202 to evaluate connectivity to one or more secondary devices 214 to which a subsequent connection can be established. In step 602, the primary device 202 receives a connection request from a remote device 204. In step 604, the primary device 202 sends an invitation to one or more secondary devices 214 to connect to the remote device 604 via the primary device 202. In some embodiments, the primary device 202 sends the invitation through a cloud-based service to which the primary device 202 and the one or more secondary devices 214 share a common identifier. In some embodiments, the primary device 202 and/or one or more servers, e.g., the cloud-based server 216, of the cloud-based service can determine a set of secondary devices 214 that both share an identifier with the primary device 202 and are actively associated with a cloud-based service, e.g., signed in. In some embodiments, the cloud-based service sends the invitations for a connection request to only secondary devices 214 that are actively associated with the cloud-based service. In some embodiments, the invitation includes an IP address (or a list of IP addresses) and an identifier for a port (or a list of identifiers for ports) for the primary device 202 to which the secondary devices 214 can subsequently establish an IP/UDP connection to extend the incoming connection request (if accepted) from the remote device 204. The primary device 202 can determine, in step 606, whether a connectivity evaluation packet is received from one or more secondary devices 214 in accordance with the invitation. When no answer is received from any secondary devices 214, as indicated in step 614, the method can proceed to any steps for which no answer to the incoming connection request may be appropriate, e.g., divert to voice mail. In some embodiments, the primary device 202 executes a procedure that indicates to the remote device that a user of the primary device is not answering the connection request. When a connectivity evaluation packet is received, the primary device 202 can, in step 608, send a connectivity response to the secondary device (or devices) 214 from which the connectivity evaluation packet is received. In some embodiments, the connectivity response can include an IP address and an identifier for a port to which the secondary device 214 can establish the IP/UDP connection. In some embodiments, the connectivity evaluation packet is a UDP packet including an IP address (or a list of IP addresses) and an identifier for a port (or a list of identifiers for ports) of the secondary device 214 to which the primary device 202 can respond and subsequently establish an IP/UDP connection. In some embodiments, the primary device 202 responds to only one IP address and port combination of a secondary device 214. In some embodiments, the primary device 202 responds to multiple IP address and port combinations for the secondary device 214. The primary device 202 can respond positively to connectivity evaluation packets received from multiple secondary devices 214. In step 610, the primary device 202 determines whether an invitation response is received from at least one secondary device 214. When no response to the invitation request is received, in some embodiments, the primary device 202 can send determine whether to retry, in step 612, by sending another invitation or entering the no answer state 614. When the primary device 202 receives at least one invitation response from at least one secondary device 214, the primary device 202 can determine, in step 616, whether the invitation response indicates an acceptance of the connection request. When the user accepts the invitation request, in step 620, the primary device 202 can establish a connection with the remote device 204, from which the connection request originated, e.g., through a cellular wireless network or another connection, and also establish an IP/UDP connection with one of the secondary devices 214. When the user indicates no acceptance, e.g., a decline to accept or a divert, the primary device 202 can enter an appropriate state, such as the decline state 618 or another comparable state in which a negative or diversion response can be provided to the remote device 204. In some embodiments, the IP/UDP connection is established using IP addresses and ports exchanged as part of the connectivity evaluation and response packets. In some embodiments, the IP/UDP connection is established through a local area network connection through which both the primary device 202 and secondary device 214 can communicate. In some embodiments, the IP/UDP connection is established using an ad hoc peer-to-peer connection directly between the primary device 202 and the secondary device 214.

Figure 7:
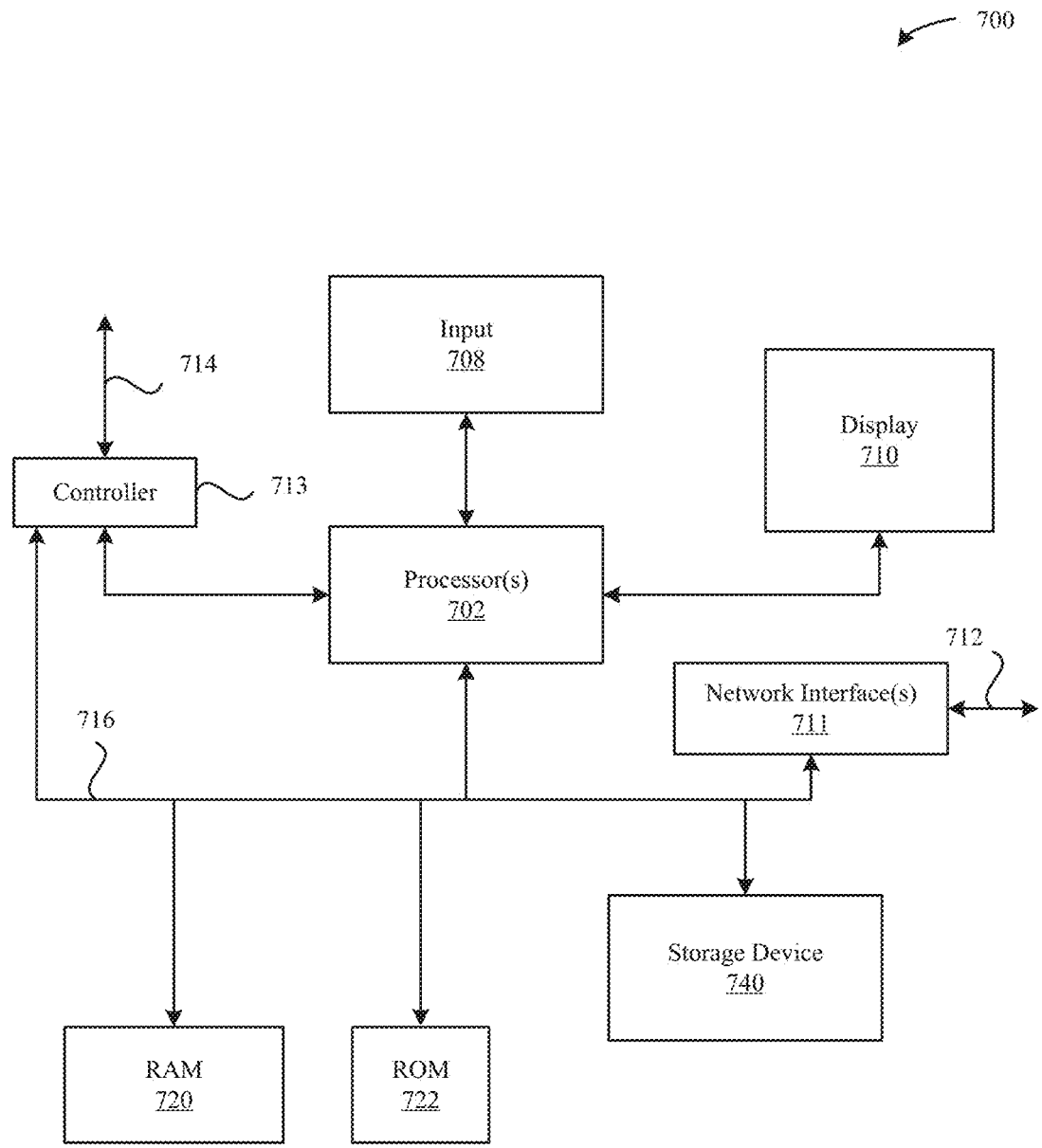
FIG. 7 illustrates a detailed view of an example computing device that can be used to implement at least a portion of the various techniques described herein, in accordance with some embodiments.

FIG. 7 illustrates a detailed view of an example computing device 800 that can be used to implement one or more aspects of the various methods described herein, in accordance with some embodiments. In particular, the detailed view illustrates various components that can be included in the wireless communication device 102 illustrated in FIG. 1. As shown in FIG. 7, the computing device 700 can include one or more processors 702 that represent a microprocessor or controller for controlling the overall operation of computing device 700. The computing device 700 can also include a user input device 708 that allows a user of the computing device 8700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (e.g., screen display) that can be controlled by the processor 702 to display information to the user. A data bus 716 can facilitate data transfer between at least a storage device 740, the processor(s) 702, and a controller 713. The controller 713 can be used to interface with and control different equipment through an equipment control bus 714. The computing device 700 can also include one or more network/bus interfaces 711 that couple to one or more data links 712. In the case of a wireless connection, the network/bus interfaces 711 can include wireless circuitry, e.g., a wireless transceivers/modems/baseband processors etc. that can provide for wireless connections in accordance with one or more wireless communication protocols.

The computing device 700 also include a storage device 740, which can comprise a single disk or a plurality of disks (e.g., hard drives) and/or memory, and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores computer-executable instructions related to the operation of the computing device 700.

The various aspects, embodiments, implementations or features of the described embodiments can be used separately or in any combination. Various aspects of the described embodiments can be implemented by software, hardware or a combination of hardware and software. The described embodiments can also be embodied as computer readable, computer-executable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method to evaluate connectivity between a secondary device and a primary device to support a connection for a real-time application, the method comprising:
   at the secondary device:
      receiving an invitation through a first communication path from the primary device to connect with a remote device;
      sending at least one connectivity evaluation packet to the primary device through a second communication path;
      determining whether a connectivity response is received from the primary device;
      when the connectivity response is received from the primary device, providing an indication of the invitation to connect with the remote device at the secondary device;
      in response to input accepting the invitation to connect with the remote device, sending to the primary device an invitation response to accept the invitation to connect with the remote device through the first communication path; and
      in response to a connection establishment request from the primary device, establishing a connection to the primary device through the second communication path to connect with the remote device to support the real-time application.

2. The method of claim 1, wherein the at least one connectivity evaluation packet comprises one or more user datagram protocol (UDP) packets.

3. The method of claim 2, wherein the one or more UDP packets each include one or more Internet Protocol (IP) addresses for the secondary device and one or more port identifiers of the secondary device through which to establish the connection to the primary device.

4. The method of claim 1, wherein the invitation to connect with the remote device comprises a push notification using a guaranteed delivery message service.

5. The method of claim 1, wherein the invitation to connect with the remote device includes one or more IP addresses for the primary device and one or more port identifiers of the primary device through which to establish the connection between the secondary device and the primary device.

6. The method of claim 1, wherein the first communication path traverses a wide area network and the second communication path traverses a separate local area network.

7. The method of claim 1, wherein the connection between the primary device and the secondary device through the second communication path comprises an ad hoc peer-to-peer connection.

8. The method of claim 1, wherein the at least one connectivity evaluation packet includes a plurality of port identifiers of the secondary device, and further comprising at the secondary device:
   when receiving a plurality of connectivity responses from the primary device through at least two ports identified by the plurality of port identifiers of the secondary device, selecting one of the plurality of port identifiers to include in the invitation response based on performance criteria for the connection to the primary device through the second communication path.

9. The method of claim 8, wherein the performance criteria comprises a round trip delay.

10. A method to evaluate connectivity between a primary device and one or more secondary devices to support a connection for a real-time application, the method comprising:
    at the primary device:
       receiving a connection request from a remote device;
       sending an invitation through a first communication path to one or more secondary devices to connect with the remote device;

determining whether at least one connectivity evaluation packet is received from the one or more secondary devices;

when a connectivity evaluation packet is received from a secondary device of the one or more secondary devices, sending a connectivity response to the secondary device;

determining whether an invitation response is received from the secondary device; and when the invitation response is received from the secondary device, the invitation response indicating acceptance of the invitation to connect to the remote device, establishing a first connection with the remote device and a second connection with the secondary device through a second communication path to support the connection for the real-time application.

11. The method of claim 10, wherein the connectivity evaluation packet from the secondary device comprises a user datagram protocol (UDP) packet.

12. The method of claim 11, wherein the UDP packet includes one or more Internet Protocol (IP) addresses for the secondary device and one or more port identifiers of the secondary device through which to establish the connection to the primary device.

13. The method of claim 10, wherein the invitation to connect with the remote device comprises a push notification using a guaranteed delivery message service.

14. The method of claim 10, wherein the invitation to connect with the remote device includes one or more IP addresses for the primary device and one or more port identifiers of the primary device through which to establish the connection between the secondary device and the primary device.

15. The method of claim 10, wherein the first communication path includes a cloud-based server with which the primary device and the one or more secondary devices are associated with a common identifier.

16. The method of claim 15, wherein the invitation to connect with the remote device is sent through the first communication path only to secondary devices that are actively signed in to the cloud-based server.

17. The method of claim 10, wherein the connection between the primary device and the secondary device through the second communication path traverses a local area network.

18. The method of claim 17, wherein the connection between the primary device and the secondary device comprises an ad hoc peer-to-peer connection.

19. The method of claim 10, wherein the connectivity evaluation packet includes a plurality of port identifiers of the secondary device, and further comprising at the primary device:

sending at least one connectivity response to each port identified by the plurality of port identifiers of the secondary device.

20. A secondary wireless device configured to evaluate connectivity between a primary wireless device and the secondary wireless device to support a connection for a real-time application to a remote device, the secondary wireless device comprising:

wireless circuitry configured to support communication in accordance with a wireless local area network (WLAN) communication protocol;

one or more processors; and a storage device storing computer-executable instructions that, when executed by the one or more processors, cause the secondary wireless device to:

in response to receipt of an invitation to connect with the remote device, the invitation received through a first communication path from the primary wireless device, send at least one connectivity evaluation packet to the primary wireless device through a second communication path;

determine whether a connectivity response is received from the primary wireless device through the second communication path;

when the connectivity response is received from the primary wireless device through the second communication path and a user of the secondary wireless device accepts the invitation to connect with the remote device, send to the primary wireless device an invitation response to accept the request to connect with the remote device through the first communication path; and establish a connection to the primary wireless device through the second communication path to connect with the remote device to support the real-time application.

* * * * *